(12) United States Patent
Hyakutake et al.

(10) Patent No.: US 7,752,277 B2
(45) Date of Patent: *Jul. 6, 2010

(54) SYSTEM, COMPUTER PROGRAM PRODUCT AND METHOD FOR STORING INFORMATION IN AN APPLICATION SERVICE PROVIDER

(75) Inventors: Shogo Hyakutake, Boonton Township, NJ (US); Hiroaki Ishizuka, San Jose, CA (US); Minoru Aoshima, Edgewater, NJ (US)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 5 days.

This patent is subject to a terminal disclaimer.

(21) Appl. No.: 11/969,325

(22) Filed: Jan. 4, 2008

(65) Prior Publication Data

US 2008/0215690 A1 Sep. 4, 2008

Related U.S. Application Data

(60) Division of application No. 11/489,623, filed on Jul. 20, 2006, now Pat. No. 7,340,504, which is a continuation of application No. 09/840,155, filed on Apr. 24, 2001, now Pat. No. 7,117,247.

(51) Int. Cl.
*G06F 15/16* (2006.01)
*G06K 15/00* (2006.01)
*G06F 3/00* (2006.01)
*H04N 1/04* (2006.01)

(52) U.S. Cl. ............... 709/206; 358/1.12; 709/226; 707/10

(58) Field of Classification Search ............ None
See application file for complete search history.

(56) References Cited

U.S. PATENT DOCUMENTS 6,009,442 A 12/1999 Chen et al.

(Continued)

FOREIGN PATENT DOCUMENTS

JP 2000-215123 8/2000

(Continued)

OTHER PUBLICATIONS

Nippon Steel Corporation, Ideal Management of Drawings and Documents Realized by "nsxpres.com", Windows 2000 World, vol. 6, No. 1, Jan. 1, 2001, pp. 42-43.

*Primary Examiner*—Wen-Tai Lin
(74) *Attorney, Agent, or Firm*—Oblon, Spivak, McClelland, Maier & Neustadt, L.L.P.

(57) ABSTRACT

A method, system and computer program product for storing document information in an application service provider (ASP) which is connected to a user terminal through a network, such as the Internet. The method on which the system and computer program product are based includes inputting the document information into the user terminal, inputting a previously created e-mail address into the user terminal, the e-mail address being confirmed by the ASP and corresponding to a storage location in the ASP, and sending the document information to the e-mail address via the network. The document information may be input into the user terminal either manually or automatically and a storage folder may be created for storing documents to the ASP. Where the user terminal is an Internet fax machine, the Internet fax machine can be set up to automatically send all document information received by the Internet fax machine to the ASP for storage.

30 Claims, 11 Drawing Sheets

U.S. PATENT DOCUMENTS

| | | | |
|---|---|---|---|
| 6,199,115 B1 | 3/2001 | DiRienzo | 709/236 |
| 6,262,732 B1 | 7/2001 | Coleman et al. | |
| 6,480,304 B1 | 11/2002 | Os et al. | |
| 6,496,206 B1 | 12/2002 | Memyk et al. | |
| 6,564,249 B2 | 5/2003 | Shiigi | 709/206 |
| 6,608,694 B1 * | 8/2003 | Akimoto | 358/1.15 |
| 6,714,968 B1 | 3/2004 | Prust | 709/219 |
| 6,725,228 B1 | 4/2004 | Clark et al. | 707/102 |
| 6,772,139 B1 | 8/2004 | Smith, III | 707/3 |
| 6,788,769 B1 | 9/2004 | Waites | 379/93.24 |
| 7,024,431 B1 | 4/2006 | Kornelson et al. | 707/202 |
| 2001/0051990 A1 | 12/2001 | Shirakawa | 709/206 |
| 2001/0055127 A1 * | 12/2001 | Wakabayashi | 358/305 |
| 2004/0024876 A1 | 2/2004 | Ito et al. | 709/226 |
| 2004/0100648 A1 | 5/2004 | Kulakowski | 358/1.13 |
| 2004/0143456 A1 | 7/2004 | Ootsuka | 705/2 |
| 2004/0236775 A1 | 11/2004 | Leonardos | 707/100 |
| 2004/0254911 A1 | 12/2004 | Grasso et al. | 707/1 |

FOREIGN PATENT DOCUMENTS

| | | |
|---|---|---|
| JP | 2001-056789 | 2/2001 |

* cited by examiner

SYSTEM, COMPUTER PROGRAM PRODUCT AND METHOD FOR STORING INFORMATION IN AN APPLICATION SERVICE PROVIDER

CROSS-REFERENCE TO RELATED APPLICATIONS

This application is a divisional application of Ser. No. 11/489,623, filed Jul. 20, 2006, now U.S. Pat. No. 7,340,504, which is a continuation application of and claims benefit of priority under 35 U.S.C. §120 from U.S. Ser. No. 09/840,155, filed Apr. 24, 2001, now U.S. Pat. No. 7,117,247, the entire contents which is incorporated herein by reference.

BACKGROUND OF THE INVENTION

1. Field of Invention

The present invention is directed to methods, computer-based systems and computer program products for storing documents, and in particular storing documents to an application service provider.

2. Discussion of the Background

With the ever increasing complexity of business relationships, the number of paper documents generated by individuals is increasing at a rapid rate. Therefore, it is becoming more and more necessary for corporations, small businesses and even households entering into such relationships to reduce and manage paper documents. To meet this demand, business owners and other individuals have recently turned to application service providers (ASPs) that can store and manage documents at a storage location remote to the user. This saves valuable physical and electronic storage space local to the user. Moreover, ASPs can provide the user with useful document management services.

However, in order to store the documents in an ASP, it is necessary for the user to put paper documents in electronic format for transmission and storage in the ASP. Moreover, the process of storing a document to an ASP typically involves interaction with an ASP web site in order to register with the ASP and establish storage files for storing the documents. Thus, using an ASP to store documents may require a variety of electronic equipment such as an optical scanning device to scan paper documents, a printer for printing documents, and an Internet ready computer, such as a PC, for connecting and interacting with the ASP. The present inventors have proposed an integrated system for managing documents that provides all of these features in U.S. patent application Ser. No. 09/684,965 and U.S. patent application filed on Apr. 23, 2001, for example, the entire contents of which are incorporated herein by reference.

However, such an integrated system is expensive and therefore companies may provide a limited number of such devices as a resource for employees. Moreover, small businesses and family members running a household may not be able or willing to purchase such an integrated system or the separate components necessary to use ASP services. Where an ASP user does have all of the electronic equipment necessary for using an ASP, the process of storing a document may be a time consuming interactive process of accessing web page menus of the ASP. Moreover, this process may be complicated for individuals unfamiliar with using Internet resources.

SUMMARY OF THE INVENTION

An object of the present invention is to provide a simple and affordable system for efficiently managing documents using an ASP.

Another object of the present invention is to provide simple and affordable system for efficiently storing documents to an ASP These and other objects of the present invention are achieved by providing a novel method, system and computer program product for storing document information in an application service provider (ASP) which is connected to a user terminal through a network, such as the Internet. The method on which the system and computer program product are based includes inputting the document information into the user terminal, inputting a previously created e-mail address into the user terminal, the e-mail address being confirmed by the ASP and corresponding to a storage location in the ASP, and sending the document information to the e-mail address via the network.

In one aspect of the present invention, the document information may be input into the user terminal either manually or automatically. Where the document information is input manually, the document information may be input by one of scanning and downloading the document information into the user terminal. Where the document information is input automatically, the document information is stored to a memory in the user terminal as the document information is received by the user terminal. The previously created e-mail address may be input into the user terminal by storing the e-mail address in a memory of the user terminal, associating the stored e-mail address with a quick send key on a keypad of the user terminal, and inputting the e-mail address in response to a selection of the quick send key. Alternatively, the e-mail address may be typed into the user terminal by way of an alphanumeric keypad on the user terminal.

In another aspect of the invention, a storage folder may be created for storing documents to the ASP. The storage folder may be created by accessing a web page associated with the ASP, inputting a folder e-mail address for storing a particular type of document, and confirming that the folder e-mail address is accepted by the ASP. The storage folder may also be created by accessing a web page associated with the ASP, inputting a backup e-mail address for storing a particular type of document, and confirming that the backup e-mail address is accepted by the ASP.

In yet another aspect of the present invention, the document information may be sent to a user contact device and the e-mail address concurrently. The document information may be sent to the user contact device via one of a public phone line and the Internet In still another aspect of the invention, the document information may be received from a user contact device, and the document information is automatically sent to the e-mail address concurrently with receiving the document information to the user contact device.

DESCRIPTION OF THE PREFERRED EMBODIMENTS

Figure 1:
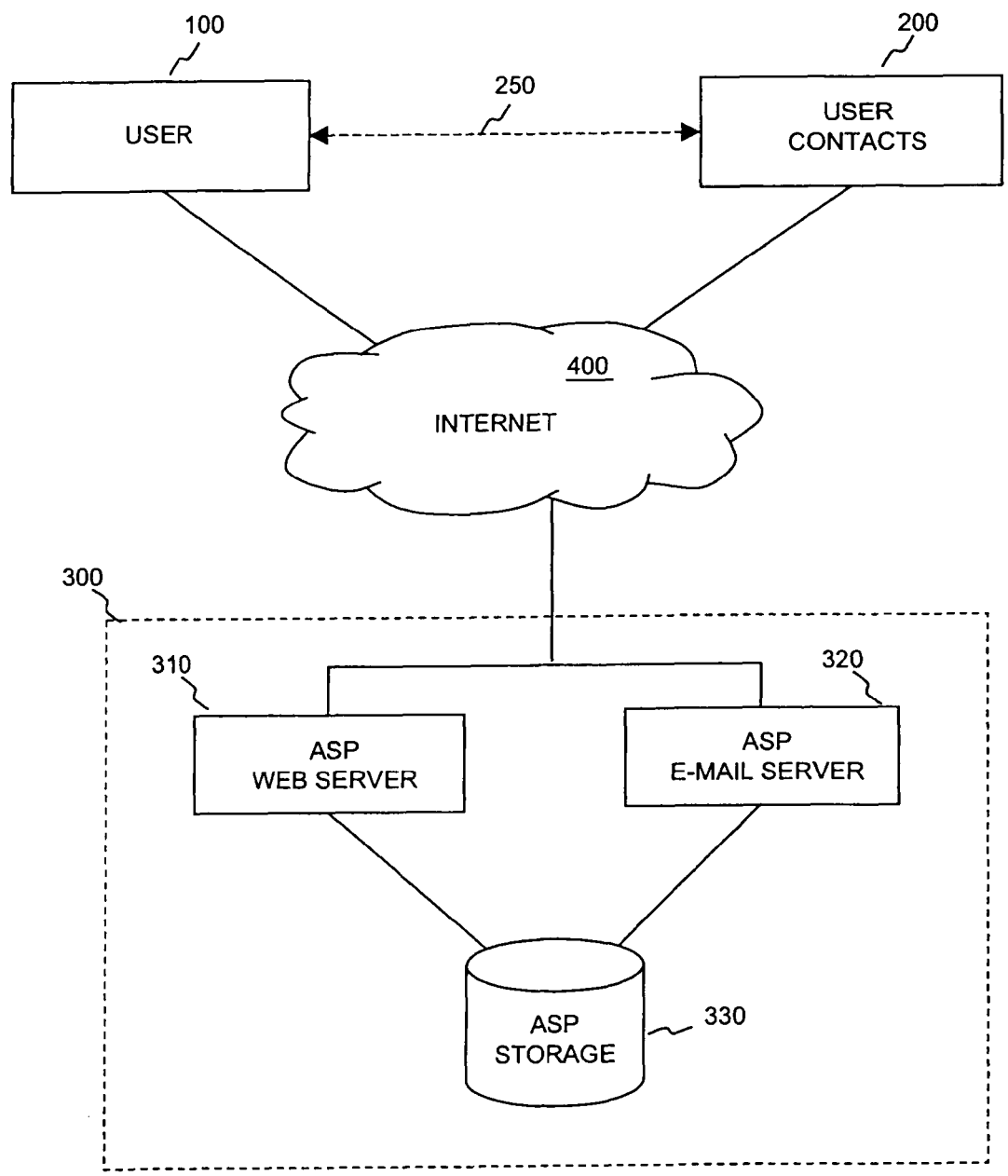
FIG. 1 is a block diagram showing an overall system configuration for managing documents according to an embodiment of the present invention.

Referring now to the drawings, wherein like reference numerals designate identical or corresponding parts throughout the several views, FIG. 1 is a block diagram showing an overall system configuration for managing documents according to an embodiment of the present invention. The system includes a user 100, a user contact 200, a public phone line 250, an ASP 300, and a network 400. The ASP 300 includes an ASP web server 310, an ASP mail server 320, and an ASP storage 330. The user 100 and/or user contact 200 may be a facsimile machine, digital copier, scanner, hand held device, or any known device for processing and communicating data via a network. In a preferred embodiment, the user 100 is an Internet facsimile machine that sends documents via the Internet as well as via the public phone line 250. All or a portion of the user 100 and/or user contact device 200 may be implemented as a general purpose computer system such as the computer system 1101 shown in FIG. 11.

The ASP 300 is a computer system for remotely providing any of a variety of services to users via a communications network. The ASP 300 includes the ASP web server 310 for managing ASP web pages and interactive connections with users, as well as an e-mail server 320 for managing incoming and outgoing e-mails for the ASP 300. The ASP storage 330 is a file that includes documents stored to the ASP 300 by the user 100 in accordance with an embodiment of the present invention, and may include applications software for controlling the ASP 300 to carry out functions in accordance with the present invention. The ASP storage 330 may also include operations for searching, sorting, recombining, and other database functions, and may be implemented as two or more databases, if desired. In a preferred embodiment, the ASP storage 330 includes storage files created by the user 100 in association with e-mail addresses. The ASP 300 may be implemented as one or more general purpose computers such as the computer system 1101 of FIG. 11.

The user 100 is connected to the user contact 200 by way of public phone line 250 such as a public switched telephone network (PSTN), and network 400 which also connects both the user 100 and user contact 200 to the ASP 300. Thus, the user 100 and user contact 200 are remote with respect to the ASP 300. The network 400 is preferably the Internet, but can also be a local area network (LAN), a wide area network (WAN), any type of network such as an intranet, an extranet, or a combination thereof. An extranet may be used to provide controlled access to external users, for example through the Internet. How the user 100 and user contact 200 can be connected to the Internet 400 is well-known in the art and is explained for example, in part 38 of "How Computers Work", by Ron White, Que Corporation, pps. 340-349, September, 1999, ISBN: 0-7897-2112-0, the entire content of this book being incorporated by reference. Other communications links for network 400, such as a virtual private network, or a wireless link, may be used as well.

It is to be understood that the system in FIG. 1 is for exemplary purposes only, as many variations of the specific hardware and software used to implement the present invention will be readily apparent to one having ordinary skill in the art. For example, the functionality of the ASP web server 310 and the ASP e-mail server 320 may be combined in a single device. To implement these variations as well as other variations, a single computer (e.g., the computer system 1101 of FIG. 11) may be programmed to perform the special purpose functions of two or more of the devices shown in FIG. 1. In addition, while FIG. 1 shows a single user, user contact, and ASP, the system may include multiple devices interconnected by way of a common network, and ASP storage 330 may be connected to ASP 300 by way of Internet 400. Principles and advantages of distributed processing, such as redundancy and replication, may also be implemented as desired to increase the robustness and performance of the system, for example.

Figure 2:
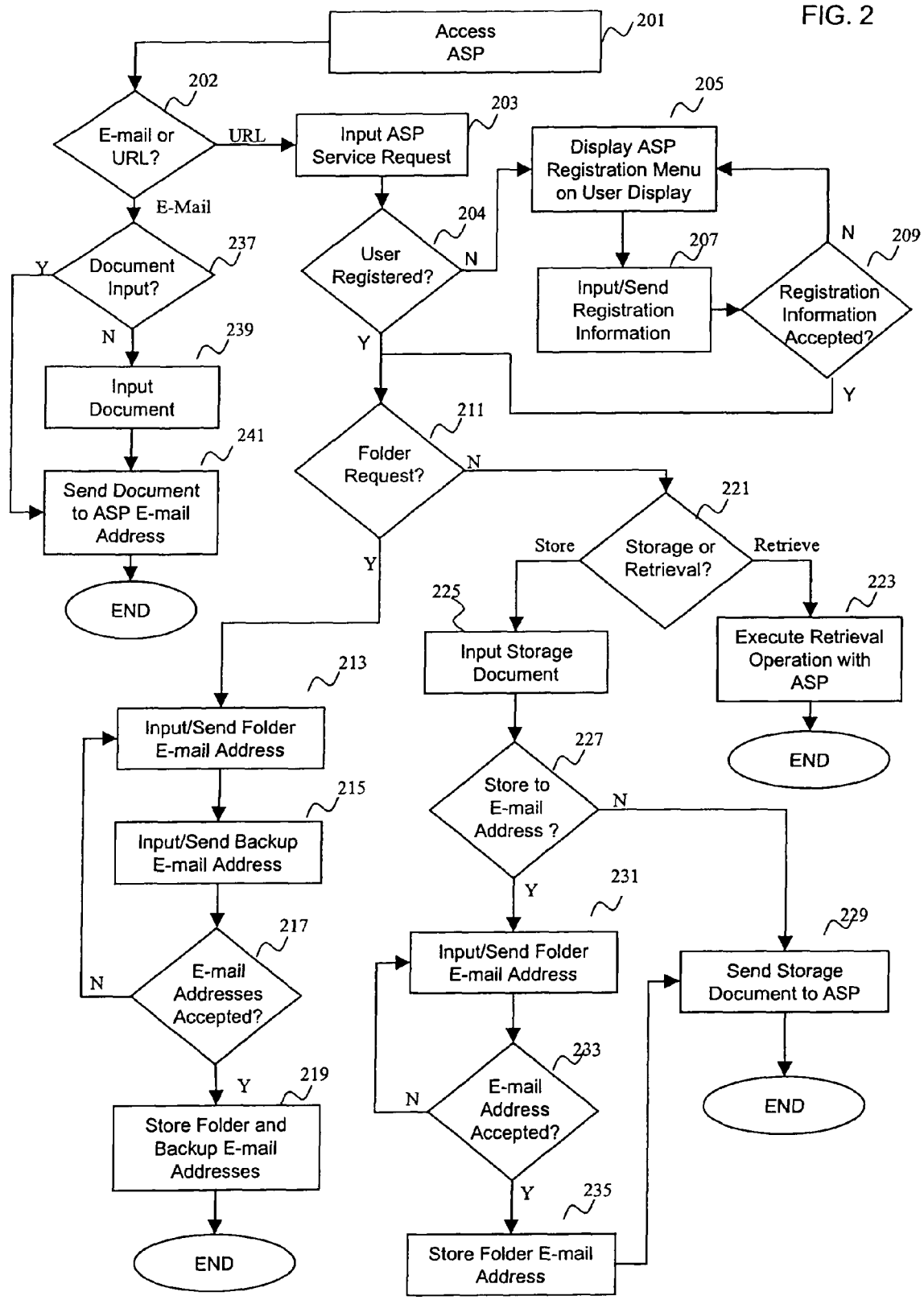
FIG. 2 is flowchart illustrating the process steps performed by the user in managing documents according to one embodiment of the present invention.

FIG. 2 is flowchart illustrating the process steps performed by the user 100 in managing documents according to one embodiment of the present invention. The process begins with the user 100 accessing the ASP 300 as shown in step 201. In the embodiment shown in FIG. 2, the user 100 identifies an ASP for storage of the user document based on an input from an operator of the user 100. In an alternative embodiment, the user 100 may interact with a document manager to conduct a document consultation session for determining the proper ASP for storage of the user document. A document consultation process is disclosed in U.S. patent application Ser. No. 09/684,965 and U.S. patent application filed on Apr. 23, 2001.

The user 100 may access the ASP 300 by entering an e-mail address containing a document name followed by an @ symbol followed by the host name of the ASP e-mail server 320 of the ASP 300, or alternatively by entering a uniform resource locator URL for accessing the ASP web server 310 of the ASP 300. Where the access information includes an e-mail address, the user 100 has previously registered with the ASP and created the e-mail address for storing documents. Where a URL is input to access the ASP web server 310, the user intends to request an ASP service and the access information preferably also includes a user ID if the user 100 is registered with the ASP 300. The user 100 preferably includes a display and control panel for entering the access information. The control panel may be a alphanumeric keypad for typing in the access information, or a one touch keypad for entering previously stored e-mail addresses and URLs. The user 100 also preferably includes web browser software for interacting with the web pages located on the ASP web server 310 in a client server relationship. Alternatively, the user 100 may be connected to a general purpose computer system, such as system 1101 described in FIG. 11, which provides world wide web capabilities for the user 100.

Once the ASP 300 is accessed, the user 100 determines whether the operator of the user has input an e-mail address or a URL as shown in decision block 202. In a preferred embodiment, the operator enters a previously created e-mail address and the user 100 sends documents to the ASP e-mail server 320 for storage as will be further described below. If the access information includes a URL, the user 100 proceeds to step 203 where an ASP service request is input to the user 100. The ASP service request may be made as part of step 201 when the user 100 initially accesses the ASP 300, or may be subsequently inputted to the user 100 in step 203 in response to the ASP 300 downloading a service request web page to the user 100, for example. The ASP service request may be a request to create a storage folder, or a request to store a document to the ASP 300 or retrieve a document from the ASP 300. Moreover, the ASP service request may include a user ID where the user 100 is already registered with the ASP and the user ID is not input as part of the access information.

As shown by decision block 204, once the ASP service request is input to user 100, the user 100 determines whether the user 100 is registered with the ASP. Registration is a process whereby the user 100 inputs a user ID, password, mailing address, credit card information, and/or other information for uniquely identifying the user as a client of the ASP 300. Whether the user is registered is determined based on feedback from the ASP 300. For example, if the user 100 does not input a user ID or inputs an improper user ID as part of the access information or service request, the ASP 300 may return a message indicating this condition. If the user is registered, the user 100 proceeds to decision block 211 as will be described below. However, if the user 100 is not registered, the user 100 proceeds to step 205 where the user 100 displays an ASP registration menu on a display associated with the user 100. The ASP registration menu is preferably an ASP web page downloaded from the ASP web server 310, but may be stored in the user 100. The ASP registration menu may be configured according to any known method of configuring an input menu, and provides a mechanism for the operator of the user 100 to input registration information into the user 100. In step 207, the user 100 inputs registration information in response to entries from the operator of the user 100. Once the registration information is input, this information is sent to the ASP web server 320.

In the decision block 209, the user 100 determines whether the registration information sent to the ASP has been accepted by the ASP 300. The determination of decision block 209 is made based on feedback from the ASP 300. If the registration information is not accepted by the ASP 300, the user 100 returns to step 205 where the ASP registration menu is again displayed on the user 100 so that the user may re-enter registration information. In a preferred embodiment, a message is also displayed for the operator of user 100, informing the operator that the previously entered registration information has not been accepted. If it is determined in step 209 that the registration information has been accepted, the user 100 proceeds to decision block 211 where the user 100 determines whether a folder request has been made.

In preferred embodiment of the present invention, an operator of user 100 may place a service request with an ASP solely for the purpose of creating a folder for storing documents in the ASP 300. In decision block 211, the user 100 determines whether the service request is a folder request. If the service request is not a folder request, the user 100 determines that the service request is a storage or retrieval request and proceeds to decision block 221 as will be described below. However, if the user 100 determines that the service request is a folder request, the user 100 proceeds to step 213 wherein the user 100 inputs and sends a folder e-mail address to the ASP 300. The folder e-mail address is an e-mail address where user documents are sent for storage in the ASP 300. In one embodiment of the present invention, the e-mail address includes a document name preceding the @ symbol of the e-mail address so that each stored document has a unique e-mail address. In another embodiment, a document type may precede the @ symbol of the e-mail address so that several documents can be stored under one e-mail address. For example, a user may wish to designate the e-mail address Amarketing.com@ as the e-mail address for all marketing documents sent by the user 100. According to one embodiment, the user 100 may also input a folder name associated with the e-mail address. The folder e-mail address is preferably input to the user 100 by an operator of the user in response to a message displayed by the user 100 after the user has determined that a folder request has been made. In an alternative embodiment, the operator may input the folder name and folder e-mail address in step 203 when the operator inputs the ASP request.

In the embodiment of the present invention shown FIG. 2, a back up e-mail address may also be created in the ASP 300. Thus, after inputting and sending the folder name and folder e-mail address in step 213, the user 100 proceeds to step 215 wherein the user inputs and sends a back up e-mail address. The back e-mail address is an e-mail address that will establish a back up storage location in the ASP for automatically storing electronic documents created, sent, or received by the user 100. For example, where the user 100 is a general purpose computer containing a Acompany policy@ folder, all documents written to the company policy folder may be forwarded to a backup e-mail address at the ASP where the document is stored. In another embodiment, where the user 100 is an Internet fax machine, all faxes received by the Internet fax machine may be forwarded to a backup e-mail address at the ASP 300. Thus, the backup e-mail address serves as a safety storage for important documents that are stored in any storage device within the user 100. As with the folder name and folder e-mail address, the back e-mail address may be input to user 100 in response to a message displayed to the operator after the user 100 has determined that a folder request has been made, or may be input by the operator in step 201.

Once the folder e-mail address, and/or the back e-mail address have been input to the user 100, the user 100 proceeds to decision block 217 where the user 100 determines whether the e-mail address(es) have been accepted by the ASP 300. The determination in decision block 217 is made based on feedback from the ASP 300. If either the folder e-mail or the back up e-mail address is not accepted by the ASP 300, then the user 100 returns to step 213 to initiate the re-input of the e-mail addresses. In a preferred embodiment, the user 100 also displays a message to the operator notifying the operator that the folder e-mail address and/or back up e-mail address has not been accepted by the ASP 300. If the user 100 determines in step 217 that the e-mail address or addresses have been accepted by the ASP 300, the user 100 preferably displays a message notifying the operator of the user that the e-mail address(es) have been accepted and proceeds to step 219.

In step 219, the folder and/or back up e-mail addresses are stored in a memory of the user 100 where the e-mail addresses can be later used for efficient storage of user documents according to a preferred embodiment of the present invention. Storing of the folder and/or back up e-mail addresses may be performed manually by the operator of the user 100. In this embodiment, the user 100 preferably displays a message to the operator notifying the operator that the e-mails should be typed into an input panel of the user 100. Alternatively, step 219 may be performed automatically in response to feedback from the ASP 300 indicating that the e-mail addresses have been accepted. That is, the e-mail address(es) may be automatically downloaded from the ASP 300 to a memory of the user 100 after being accepted by the ASP 300.

As mentioned above with respect to decision block 211, where the user 100 determines that the ASP service request is not a folder request, the user 100 then determines whether the ASP service request is a storage request or a retrieval request as seen in decision block 221. If the ASP service request is a retrieval request, the user 100 proceeds to step 223 where the user executes a retrieval operation with the ASP 300. Step 223 is a process wherein the user 100 interacts with the ASP 300, specifically the ASP web server 310, to retrieve documents from the ASP 300. The documents retrieved may be documents previously stored in the ASP 300 by the user 100, or documents that the ASP 300 locates as a result of a search query provided by the user 100. A process for executing a retrieval operation with an ASP is disclosed in U.S. patent application Ser. No. 09/684,965 and U.S. patent application filed on Apr. 23, 2001.

If decision block 221 results in the user 100 determining that the service request is a request to store documents in the ASP 300, the user 100 inputs the storage documents as seen in Step 225. This inputting of the storage document into the user 100 may be accomplished by optically scanning, downloading, or otherwise electronically inputting the storage documents to the user 100. Once the storage document is input to the user 100, the user 100 determines whether the input document should be stored to the ASP by use of an e-mail address as seen in decision block 227. This determination is preferably made in response to an operator input to a user displayed request for storage information. Where the input document is not to be stored by using an e-mail address, the user 100 proceeds to step 229 where the document input in step 225 is sent to the ASP 300. In this regard, the user may have to specify or establish a non-e-mail storage location in the ASP 300 by further interaction with the ASP web server 310. A process for executing a storage operation with an ASP without using an e-mail address is disclosed in U.S. patent application Ser. No. 09/684,965 and U.S. patent application filed on Apr. 23, 2001.

Where the user 100 determines that the user document will be stored using an e-mail address, the user 100 proceeds to step 231 wherein a folder e-mail address for the storage document is input to the user 100 and sent to the ASP 300. The folder e-mail address is preferably input by an operator of the user 100 in response to the user 100 displaying a request to the operator for an e-mail address. Alternatively, the e-mail address may be input by an operator of the user 100 as part of inputting the storage document in step 225. Once the folder e-mail address is input to the user 100 and sent to the ASP 300, the user 100 determines whether the e-mail address is accepted by ASP 300 as shown is step 233. As with step 217 previously discussed, the user 100 determines whether the e-mail address has been accepted by the ASP 300 based on feedback from the ASP 300. If the e-mail address has not been accepted by the ASP 300, the user 100 displays a message to the operator of the user indicating this condition, and returns to step 231 for inputting and sending a new e-mail address. However, if the e-mail address is accepted, the user 100 stores the e-mail address in a memory for future reference as indicated by step 235. As previously mentioned, the e-mail address can be stored either automatically or manually. With the e-mail address accepted and stored in the user 100, the user 100 proceeds to step 229 where the user 100 sends the document to the ASP 300. In this regard, the user 100 attaches the document input in step 225 to an e-mail addressed to the folder e-mail address stored in step 235.

As mentioned above with respect to decision block 202, in a preferred embodiment of the present invention, the user 100 inputs an e-mail address when accessing the ASP 300 and therefore proceeds to decision block 237. In decision block 237, the user 100 determines whether a document has been input to the user 100. In a preferred embodiment, the document is previously input to the user 100 either by manual input by the operator, or by automatic input by the user 100. Manual input may include the operator of the user scanning the document into the user 100 as part of the accessing step 201, for example. As an example of automatic input, the user 100 automatically reads a document in response to some event such as an operator saving the document to a particular folder or the user 100 receiving or sending the document as discussed above with respect to the backup e-mail address. With the document previously input, the user 100 proceeds to step 241 wherein the user 100 sends the document to the e-mail address. As part of step 241, the user 100 attaches the document to an e-mail addressed to the email address, and then transmits the document as an attachment to the e-mail to the e-mail address. Thus, the user 100 stores documents to ASP 300 in a simple and efficient manner using an e-mail address associated with a storage location in the ASP.

Where a document has not been input to the user 100, the user 100 inputs the document in step 239 by optically scanning, downloading, or otherwise electronically inputting the document. In this embodiment, the user 100 preferably displays a request to the operator to input the document. With the document input, the user 100 proceeds to step 41 where the document is sent to the ASP e-mail address for storage in the ASP as previously described.

Thus, FIG. 2 describes the operation of the user 100 in managing documents by using the ASP 300. The user 100 may access the web server 310 of the ASP 300 to execute a service request such as creating a folder, sending a document to the ASP 300, or retrieving a document from the ASP 300. Alternatively, the user 100 can efficiently store documents to the ASP 300 by inputting an e-mail address where the document to be stored is sent for storage in the ASP 300.

Figure 3:
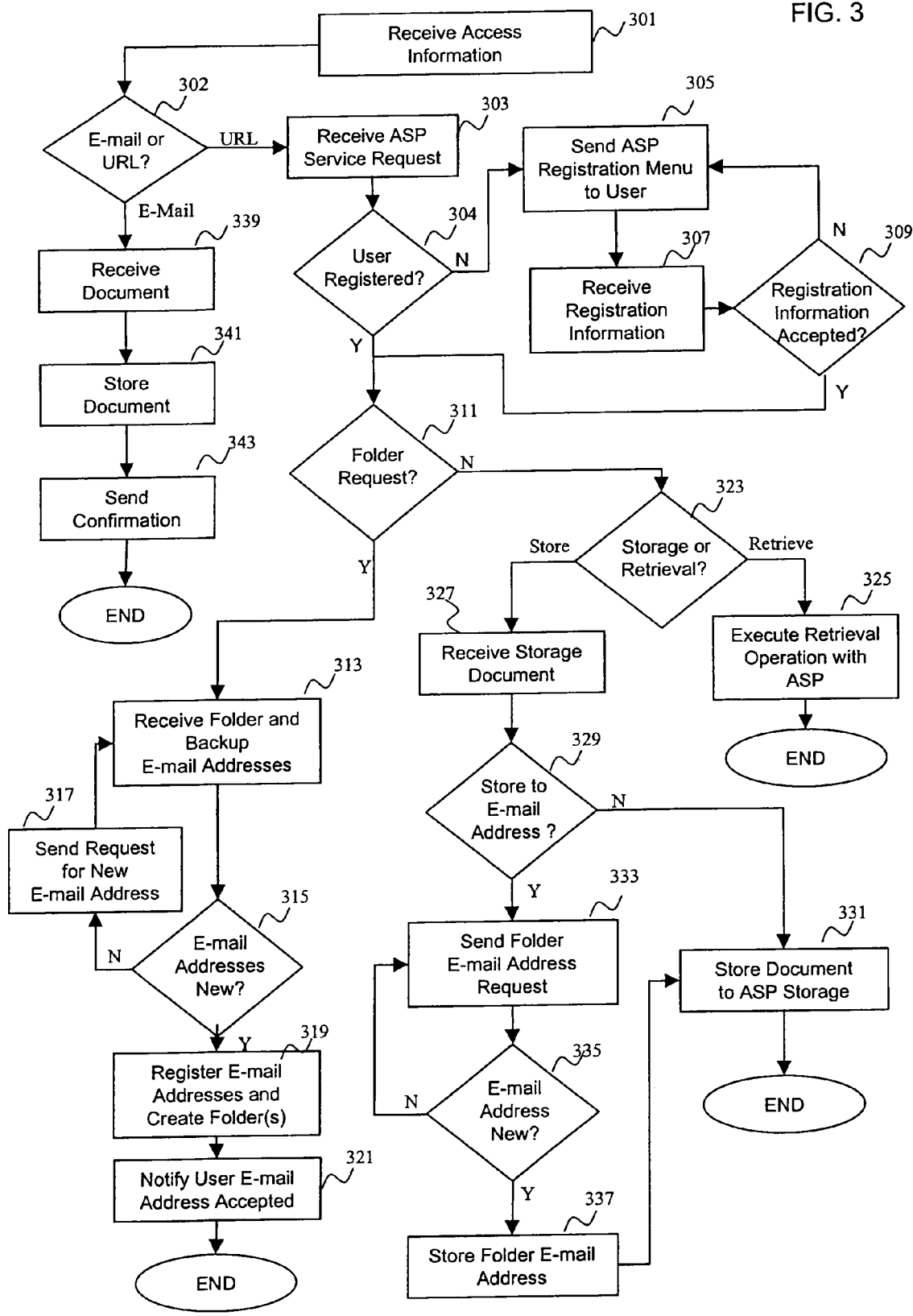
FIG. 3 is flowchart illustrating the process steps performed by the ASP in managing documents according to one embodiment of the present invention.

FIG. 3 is flowchart illustrating the process steps performed by the ASP 300 in managing documents according to one embodiment of the present invention. In step 301, the ASP 300 receives access information from the user 100. The access information may include an e-mail address for storing a document to the ASP 300 by way of the ASP e-mail server 320, or a URL for executing an ASP service request by way of the ASP web server 310. In step 302, the ASP 300 determines whether the access information includes an e-mail address or URL. If an e-mail address is included, the ASP 300 proceeds with step 339 as will be further described below. If the access information includes a URL, the ASP web server 310 of the ASP 300 receives a service request from the user 100 as indicated in step 303. The service request may be a request to establish a folder for storing user documents, or a request to store documents to the ASP 300 or retrieve documents from the ASP 300. The service request or access information may also include a user ID where the user is registered with the ASP. Based on this service request received, the ASP 300 then determines whether the user 100 is registered with the ASP 300 as shown in step 304.

The determination of whether the user 100 is registered with the ASP 300 may be made based on whether a user ID is received as part as part of the access information in step 301 or service requirement in step 303, and whether the user ID received is valid. If the ASP 300 determines that the user is not registered, the ASP 300 sends the user 100 an ASP registration menu in step 305 that allows the user to register with the ASP 300. The ASP registration menu is preferably a web page menu located in a directory associated with the ASP web server 310. With the ASP registration menu sent, the ASP 300 awaits receipt of registration information from the user 100. In step 307, the ASP 300 receives registration information from the user 100 and the registration information is either accepted or rejected by the ASP 300 as shown in decision block 309. If the registration information is not accepted because the user ID includes illegal characters or the credit card number entered is invalid, for example, the ASP 300 returns to step 305 and re-sends the ASP registration menu to the user. In a preferred embodiment, the ASP 300 also sends a message indicating that the registration information previously input by the user 100 was not accepted by the ASP 300, so that the user 100 can display this message an operator of the user. If the ASP 300 determines in step 309 that the registration information is accepted, the ASP 300 then proceeds to decision block 311.

In step 311, the ASP 300 determines whether the ASP service request received from the user 100 in step 301 is a folder request. As mentioned with respect to FIG. 2, a folder request is a request by the user to create a folder for future storage and/or backup of user documents. If the service request is not a folder request, then the ASP 300 determines whether the service request is a storage or retrieval request in decision block 323 as will be further described below. However, if the ASP service request is determined to be a folder request, the ASP 300 receives a folder e-mail address and/or a back up e-mail address from the user 100 as shown in step 313.

In decision block 315, the ASP 300 determines whether the e-mail address received in step 313 is a new e-mail address. In performing decision block 315, the ASP 300 compares the e-mail address received in step 313 with all e-mail addresses previously established by the ASP e-mail server 320. If the e-mail address received in step 313 matches an e-mail address previously establish by the ASP 300, then the e-mail address is determined not to be new and the ASP 300 proceeds to step 317 wherein the ASP 300 sends a request for a new e-mail address to the user 100. In a preferred embodiment, where the e-mail address received in step 313 is both a folder e-mail address and a back up e-mail address, the request for new e-mail address sent in step 317 specifies which one or both of the e-mail addresses was determined not to be new. If ASP 300 determines in decision block 315 that the e-mail address received in step 313 is new, then the ASP 300 registers the e-mail address and creates a folder as shown in step 319. Registration of the e-mail address in step 319 preferably includes storing the e-mail address in the e-mail server 320 and associating the e-mail address with a storage location in the ASP storage 330. Where a folder name is sent by the user 100 along with the e-mail address, the folder name received is used as the name of the storage location in the ASP storage 330. However, where no folder name is specified, the e-mail address may be used as the name of the storage location in the ASP storage 330. In addition, in one embodiment of the present invention, the user documents to be stored in the ASP 300 remain as attachments to the e-mail sent by the user 100. In another embodiment, the ASP e-mail server 320 separates the document attachment from the e-mail and stores the document to a folder associated with the e-mail address. Thus, the registered e-mail address serves as a storage location for documents sent from the user 100 to the ASP 300. In addition, as part of step 319, the e-mail address is associated with the user ID received as part of the registration information in step 307. After the e-mail address is registered, the ASP 300 notifies the user 100 that the e-mail was accepted as shown in Step 321.

As mentioned above, where the ASP 300 determines in step 311 that the service request is not a folder request, the ASP proceeds to step 323 where it determines whether the service request is a request to store documents to the ASP 300, or to retrieve documents from the ASP 300. If the service request is a request to retrieve documents from the ASP 300, the ASP 300 executes retrieval operation with the user 100 as shown by step 325. Where the ASP 300 determines that the service request is a storage request, the ASP 300 receives the storage document from the user 100 as shown in step 327. In decision block 329, the ASP 300 determines whether the storage document received in step 327 is to be stored to an e-mail address using the ASP e-mail server 320, or to a file location using the ASP web server 310. In a preferred embodiment, this determination is made based on feedback from the user 100 in response to a storage information request sent from the ASP 300 to the user 100. Where the document will not be stored to an e-mail address, the ASP 300 proceeds to step 331, where the ASP 300 stores the document to ASP storage 330. In this regard, the ASP web server 310 may require the user 100 to specify or establish a file location for the storage of the ASP document.

Where the document received in step 327 will be stored using an e-mail address, the ASP 300 sends a folder e-mail address request to the user 100 as shown in step 333 and waits to receive an e-mail address from the user 100. In step 335, the ASP 300 determines whether the folder e-mail address received from the user 100 is a new e-mail address. If the e-mail address is determined not to be new, the ASP 300 returns to step 333 where the ASP sends another folder e-mail address request to the user 100. Where the ASP e-mail server 320 determines in decision block 335 that the e-mail address received from the user 100 is a new e-mail address, the ASP 300 stores the received e-mail address for future reference in step 337, and proceeds to step 331 where the ASP 300 stores the document received in step 327. Where step 331 proceeds from the process of creating an e-mail address, the storage document received is efficiently sent to the e-mail address created. In a preferred embodiment, the ASP 300 also sends a message to the user 100 notifying the user that the e-mail address received has been accepted.

As mentioned above, according to a preferred embodiment, the user inputs an e-mail address as access information where a document is to be stored to the ASP as seen by decision block 339. Once it is determined that an e-mail address is included in the access information, the ASP e-mail server 320 receives the e-mail sent by the user 100 along with any document attachments attached to the e-mail as seen in step 339. The document is then stored in the ASP storage 330 as shown by step 343. In a preferred embodiment, the ASP e-mail server 330 generates a confirmation message indicating that the document sent by the user 100 has been stored in the ASP. The confirmation message is sent in step 343.

Thus, FIG. 3 describes the operation of the ASP 300 in managing documents of the user 100. The ASP 300 provides the user 100 with the capability to access the web server 310 of the ASP 300 to execute a service request such as creating a folder, sending a document to the ASP 300, or retrieving a document from the ASP 300. In addition, the ASP 300 allows the user 100 to efficiently store documents to the ASP 300 by inputting an e-mail address where the document to be stored is sent for storage in the ASP 300. While FIGS. 2 and 3 disclose direct interaction between the user 100 and ASP 300. In an alternative embodiment, the user 100 may be connected to a plurality of ASPs by way of a document manager which assists the user 100 in selecting a proper ASP and with other document consultation services. In addition, the document manager can provide can provide access control, consolidated billing and other document management services for the user 100. A system which uses a document manager to connect users to ASPs is disclosed in U.S. patent application Ser. No. 09/684,965 and U.S. patent application filed on April 23. Moreover, as is understood by one of ordinary skill in the art, the process of FIGS. 2 and 3 may be modified in a known manner without deviating from the teachings of the present invention. For example, the process steps related to using a user ID to verify access to an ASP may be substituted with process steps for using finger print recognition or retina recognition to verify user access.

Figure 4:
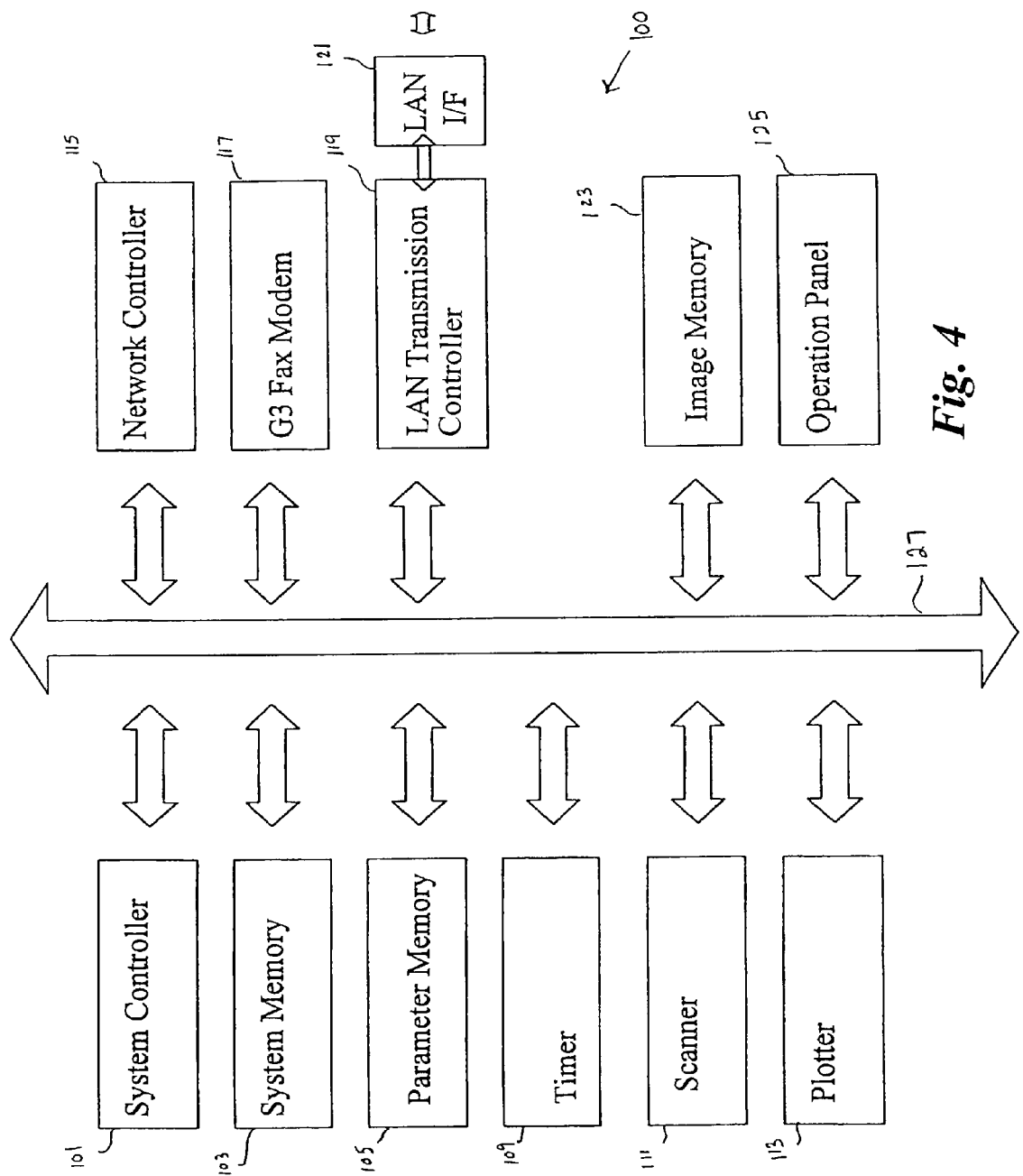
FIG. 4 is a block diagram of an Internet facsimile machine according to one embodiment of the present invention.

According to a preferred embodiment of the present invention, the user 100 is an Internet facsimile machine capable of sending and receiving documents via the Internet 400 and a public phone line 250. FIG. 4 is a block diagram of user 100 as an Internet facsimile machine 100 according to one embodiment of the present invention. As seen in this figure, the Internet facsimile machine 100 includes a system controller 101, a system memory 103, a parameter memory 105, a timer 109, a scanner 111, and a plotter 113 interconnected by way of a bus 127. Also included in the Internet facsimile machine 100 is a network controller 115, a G3 fax modem 117, a LAN transmission comptroller 119 and LAN I/F, an image memory 123, and an operation panel 125 each also connected to the bus 127.

The system controller 101 controls the Internet facsimile operation including steps to receive and transmit documents. The system controller is preferably a processor that performs functions based on software code instructions. The system memory 103 stores a control program that includes the software code instructions applied to the system controller 101, as well as data that is used when the system controller 101 executes its operation. The parameter memory 105 stores user ID, password, and other registration information, as well as e-mail addresses corresponding to a user ID and other information locally stored by the user 100 to help in carrying out the management of documents in accordance with the present invention. The system memory 103 and parameter memory 105 may be any of a variety of known memory devices including a random access memory (RAM) or other volatile storage device (e.g., dynamic RAM (DRAM), static RAM (SRAM), synchronous DRAM (SDRAM), flash RAM), and/or a read only memory (ROM) or other non-volatile storage device (e.g., programmable ROM (PROM), erasable PROM (EPROM), and electrically erasable PROM (EEPROM)).

The timer 109 is a clock device that provides current time information used in the operation of the Internet facsimile machine 100. The scanner 111 reads document information and may be implemented as any one of known optical scanning devices, a magnetic ink character recognizer, or any other mechanism for electronically inputting characters printed on paper documents. The plotter 113 is an image processing device for printing out images that are received from external devices such as other faxes and ASPs, as well as documents read from the scanner 111.

The operation panel 125 is preferably equipped with an input device, and a display for displaying instructions and ASP menus downloaded from the ASP, for example, to an operator of the Internet facsimile machine 100. The operation panel 125 includes operation keys to input user ID, password, e-mail addresses and so on, and may include one-touch keys as will be further described with respect to FIG. 5. The network controller 115 converts documents to be delivered via the Internet to a TCP/IP or similar Internet protocol, while the G3 modem 117 connects the Internet fax machine 100 to a public switched telephone network (PSTN) such as phone line 250. The LAN interface 121 connects the Internet facsimile machine 100 to a LAN, and the LAN transmission controller 119 controls communication between the Internet fax 100 and other operation terminals. The image memory 123 of the Internet facsimile machine 100 stores images received or awaiting transmission.

Figure 5:
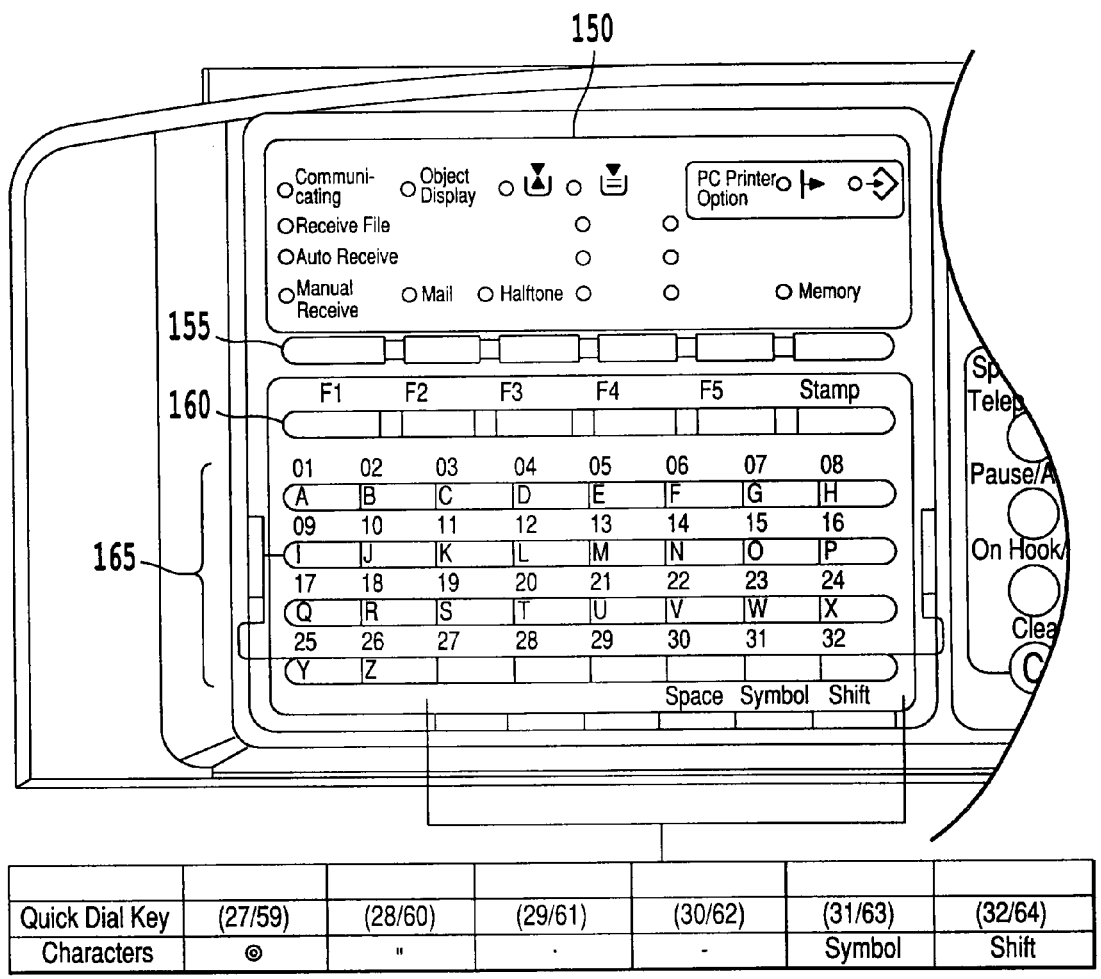
FIG. 5 is a block diagram of a control panel of an Internet facsimile machine according to one embodiment of the present invention.

According to a preferred embodiment of the present invention, the operation panel 125 includes 64 programmable quick keys for speed dialing numbers and entering frequently used e-mail addresses. FIG. 5 is an illustration of one possible operation panel 125 according this embodiment of the present invention. As seen in FIG. 5, the operation panel includes a display 150, a set of operation toggle keys 155, a set of function keys 160 and a keypad 165.

The display may be any of a variety of display screens such as a cathode ray tube or liquid crystal display (LCD). In the embodiment of FIG. 5, the display 150 displays indicators which indicate which functions are selected or de-selected by the operation toggle keys 155. For example, an auto receive operation is activated by one of the operation toggle keys, the AAuto Receive@ indicator on the display 150 will be illuminated. In a preferred embodiment, the display 150 also displays ASP menus downloaded from the ASP to the Internet facsimile machine 100.

Operation toggle keys 155 are push button keys that select or deselect operation selections of the Internet facsimile machine 100 each time the key is depressed. Similarly, the function keys 160 are push button keys that select a function to be performed by the Internet facsimile machine 100 each time the function key is depressed. For example, as seen in FIG. 5, one of the function keys 160 provides a startup function. The function keys 160 may also provide a diagnostic function, a search function, a number lock function, or any other function commonly performed by an Internet fax machine. In a preferred embodiment, the operation toggle keys 155 and the function keys 160 are programmable by the operator of the Internet facsimile machine 100.

The keypad 165 includes 32 push button keys for inputting information into the Internet facsimile machine 100. As seen in FIG. 5, the keys numbered 1 through 26 are used to input alphabetic characters, and may be used to input numeric data where a number lock function key is provided in the function key set 160. The keys numbered 27-32 are used to input other characters such as the @ symbol into the Internet facsimile machine 100. One possible set of characters that can be input using keys 27-32 of the keypad 165 is shown in the menu illustrated below the operation panel 125 in FIG. 5. Thus, the keypad 165 may be used to input alphanumeric data such as e-mail addresses and phone numbers into the Internet fax machine 100.

As mentioned above, the operation panel 125 includes 64 programmable quick keys for speed dialing numbers and entering frequently used e-mail addresses. The 32 push button keypad 165 may provide these quick keys by use of one of the operation toggle keys 155. For example, where the operation toggle key 155 for mail addresses is selected and therefore the AMail@ indicator on the display 150 is illuminated, the push button keys 1-32 may be used to individually select an e-mail address previously programmed into the key number. Where the mail operation toggle key is not selected, keys 1-32 may be used for selecting 32 different speed dial numbers previously programmed into the key numbers.

As is understood by one of ordinary skill in the art, the operation panel 125 of FIG. 5 is exemplary only and the configuration of the operation panel may be modified in a variety of ways to provide different ways store and access phone numbers and e-mail addresses without deviating from the teachings of the present invention.

Figure 6:
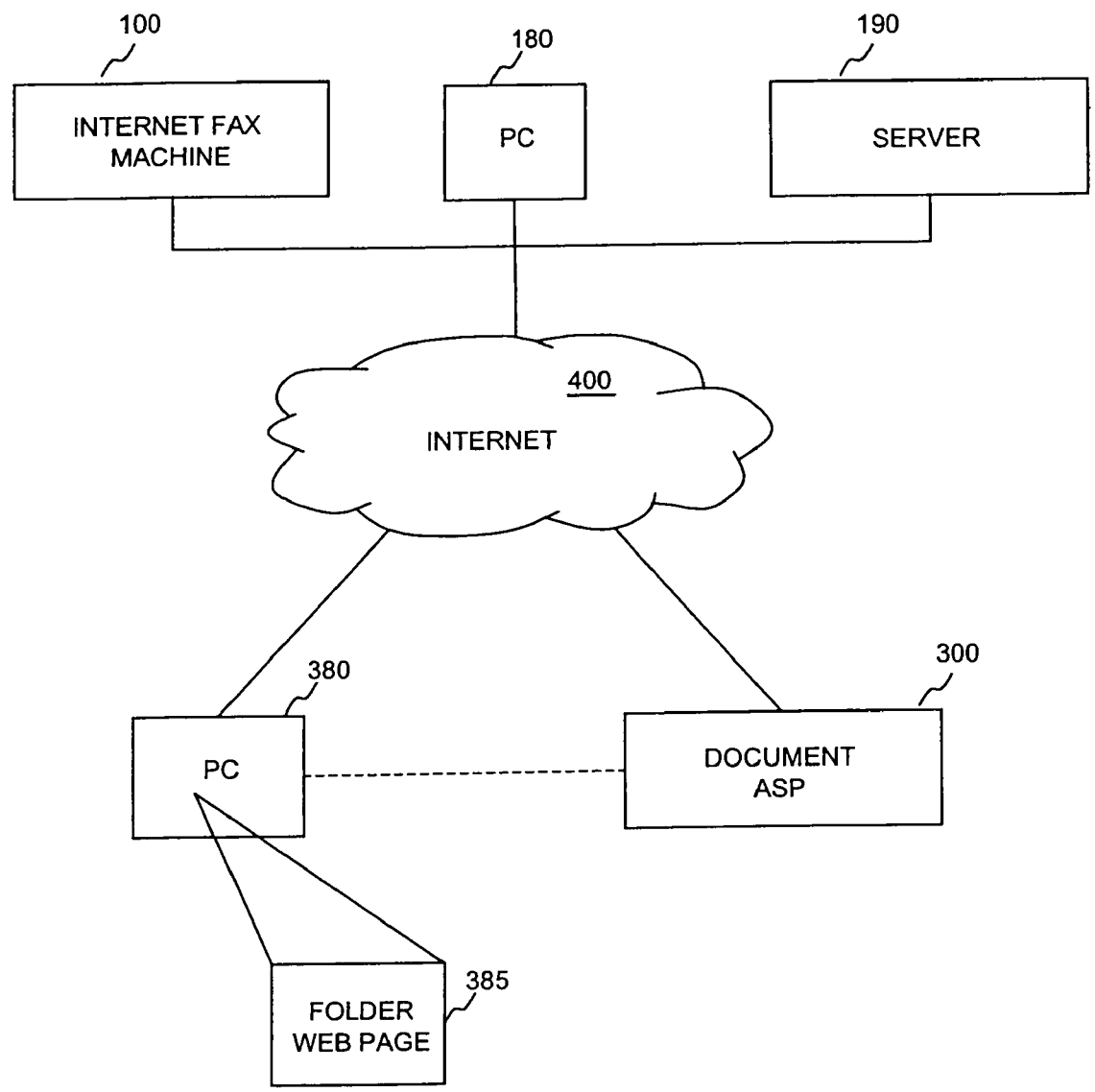
FIG. 6 is a system diagram showing the sending of documents from an Internet facsimile machine to an ASP according to one embodiment of the present invention.

As mentioned in the background section above, ASP 300 is commonly used as a storage location for important business documents. FIG. 6 is a system diagram showing the sending of documents from Internet facsimile machine 100 to ASP 300 according to one embodiment of the present invention. As seen in this figure, the Internet facsimile machine 100 is connected to document ASP 300 via the Internet 400. In the embodiment shown in FIG. 6, the Internet facsimile machine 100 is part of a LAN which includes a PC 180 and a server 190. As also seen in FIG. 6, a PC 380 may also be connected with the document ASP 300. The PCs 180 and 380 preferably include web browser software for interacting with web pages of the document ASP 300. Thus, as seen in FIG. 6, the PC 380 can display a web page 385 indicating a particular folder created in ASP 300 for storage of user documents. In particular, the PC 180 may provide registration, folder creation, and other interactive functions of the document ASP where the Internet facsimile machine 100 is not equipped with a web browser. The server 190 preferably includes an e-mail server that services the PC 180 and the Internet facsimile machine 100. The PC 180, the PC 380, and/or the Server 190 may be implemented as a general purpose computer such as the computer 1101 in FIG. 11.

Figure 7:
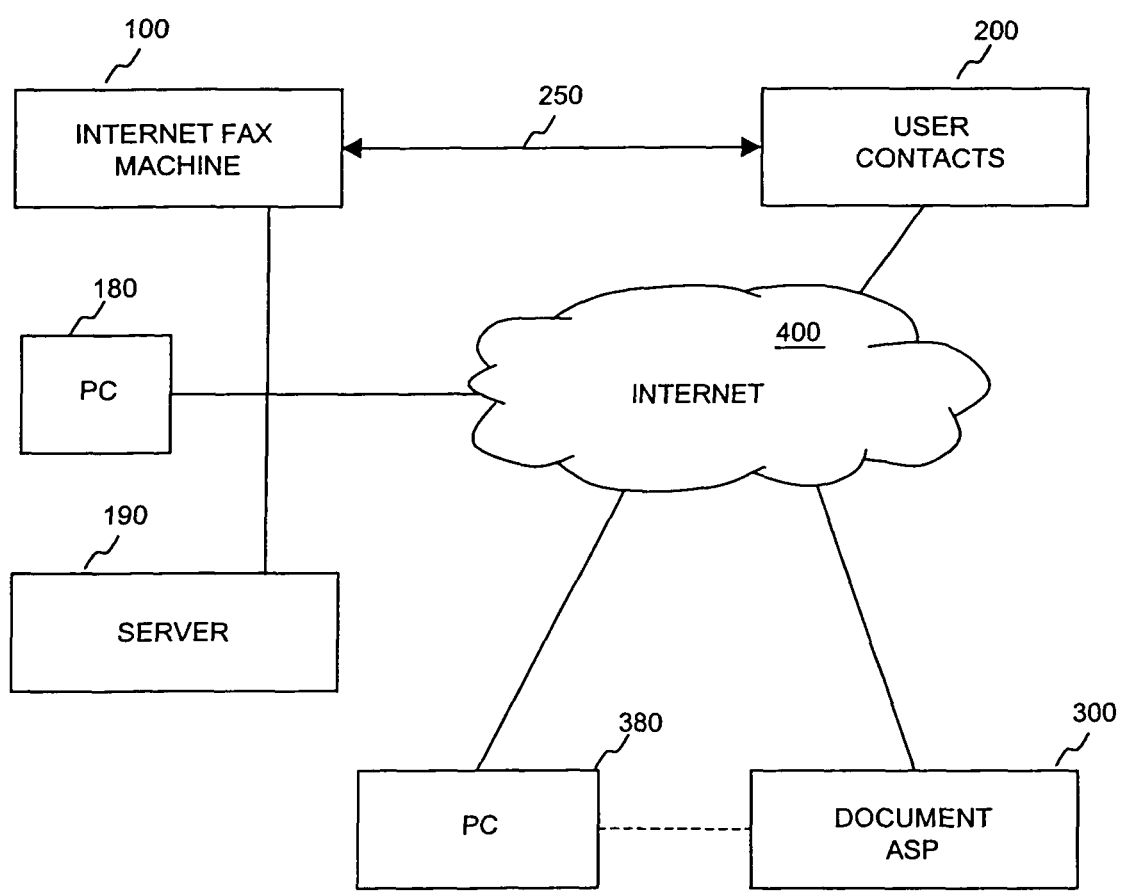
FIG. 7 is a system diagram showing the simultaneous sending of documents from an Internet facsimile machine to a user contact facsimile machine and ASP according to one embodiment of the present invention.

In a preferred embodiment of the present invention, the Internet facsimile machine 100 can use the document ASP 300 as a remote storage for faxes transmitted to remote facsimile machines. FIG. 7 is a system diagram showing the simultaneous sending of documents from the Internet facsimile machine 100 to user contact facsimile machine 200 and ASP 300 according to one embodiment of the present invention. As described with FIG. 6, the Internet facsimile machine 100 is connected to document ASP 300 via Internet 400. FIG. 7 also shows the Internet facsimile machine 100 connected to the user contact facsimile machine 200 via public phone line 250 and the Internet 400. Thus, user contact facsimile machine 200 may be capable of receiving G3 facsimile transmissions over phone line 250, and/or Internet faxes over the Internet 400.

Figure 8:
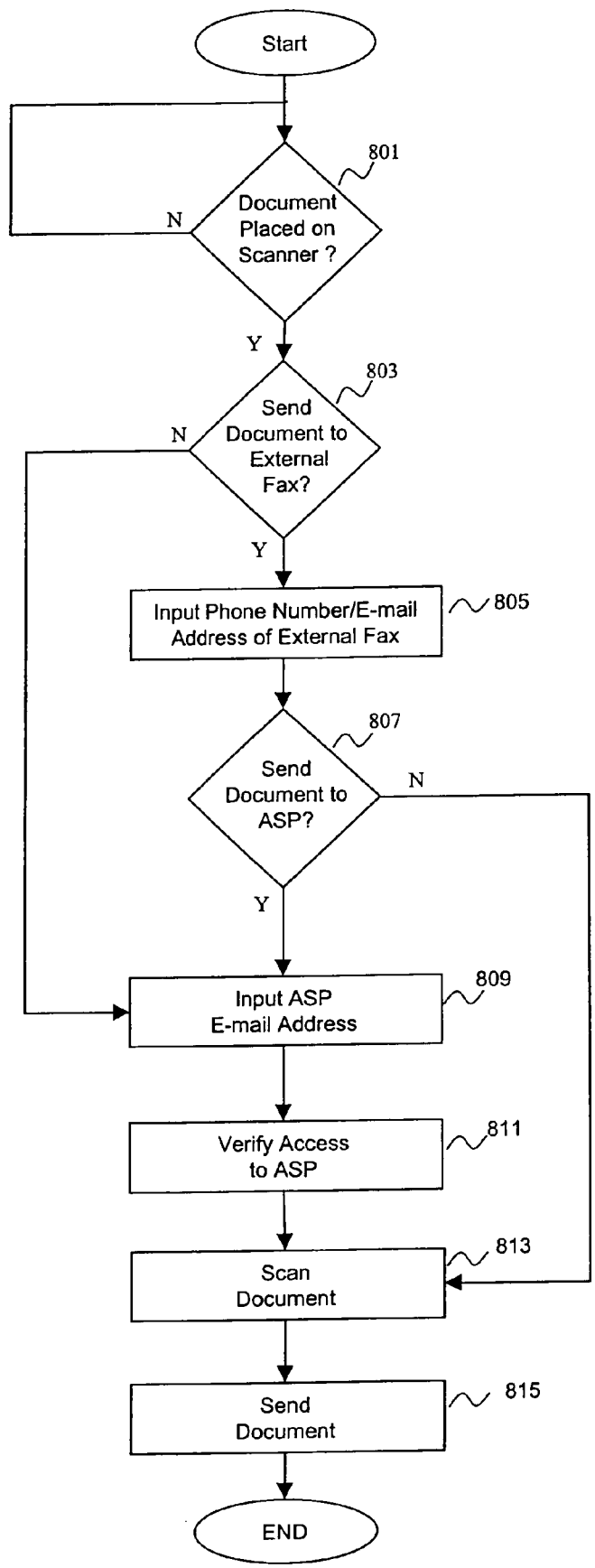
FIG. 8 is a flow chart describing the sending of documents from an Internet facsimile machine to an ASP and the simultaneous sending of documents from an Internet facsimile machine to a user contact facsimile machine and ASP according to one embodiment of the present invention.

FIG. 8 is a flow chart describing the sending of documents from an Internet facsimile machine to an ASP as depicted in FIG. 6, and the simultaneous sending of documents from an Internet facsimile machine to a user contact facsimile machine and ASP as depicted in FIG. 7, according to one embodiment of the present invention. In step 801, the Internet facsimile machine 100 determines whether a document is placed on the scanner 111 of the Internet facsimile machine 100. In a preferred embodiment, where an operator of the Internet facsimile machine 100 initiates transmission of a document without the document placed on the scanner 111, the system controller 101 causes the Internet facsimile machine 100 to display a message on the display 150 of the operation panel 125 requesting the operator to place the document on the scanner 111.

Where a document is placed on the scanner 111, in decision block 803, the Internet facsimile machine 100 determines whether the document will be sent to a user contact facsimile machine such as the facsimile machine 200 of FIG. 7. This determination may be made by the system controller 101 based on the operator=s selection on operator panel 125. Where the document will not be sent to the user contact facsimile machine 200, the Internet facsimile machine 100 determines that the document must be for storage in an ASP and proceeds to step 809 where the Internet facsimile machine 100 inputs the ASP e-mail address as will be further described below. Where the Internet facsimile machine 100 determines that the document will be sent to user contact facsimile machine 200, the Internet facsimile machine 100 proceeds to step 805 where it inputs the phone number or e-mail address of the fax machine 200. In a preferred embodiment, the phone number or e-mail address of the user contact facsimile machine 200 are input using the quick key input keypad 165 on the operation panel 125 shown in FIG. 5. In this embodiment, the desired user contact fax number or e-mail address is previously input and stored in the parameter memory 105 of the Internet facsimile machine 100 and the operator simply places the document on the scanner 111 and presses the quick key push button associated with the user contact facsimile machine 200 for transmission of the document. For example, as seen in FIG. 7, the Internet facsimile machine 100 sends a document to the user contact facsimile machine 200 by dialing the phone number A973-123-1234." According to a preferred embodiment, this number is previously stored in parameter memory 105 in association with fax machine 200 and quick key input button 22 on keypad 165, for example. Thus, to send the document to fax machine 200, an operator of the Internet facsimile machine 100 places the document on the scanner 111 and presses button 22 on the keypad.

After the user contact facsimile machine information is input to the Internet facsimile machine 100, the Internet facsimile machine 100 determines whether the document will also be sent to the document ASP 300 as shown in step 807. This determination may be made in response to operator input. Where the document will not be sent to the document ASP 300 for ASP storage, the Internet facsimile machine 100 proceeds to step 813 where the document is scanned by the scanner 111, and then sent to user contact facsimile machine 200 in step 815. In this regard, the document is sent only by way of G3 fax modem 117. Where the document will be sent to the document ASP 300 for storage, the Internet facsimile machine 100 inputs the ASP e-mail address in step 809. As with step 807 of inputting the user contact facsimile information, the user contact facsimile e-mail address is preferably input using the quick key input keypad 165 on the operation panel 125 shown in FIG. 5. Thus, the operator of the Internet facsimile machine 100 first depresses the operation toggle key 155 corresponding to e-mail addresses, and then depresses the quick key associated with the desired ASP.

Once the ASP e-mail address is input in step 809, the Internet facsimile machine 100 verifies that the user has access to the ASP 300. This verification is accomplished by the system controller 101 checking whether a valid user ID and/or password has been entered for accessing the document ASP 300. The valid ID and password may be entered by the operator as an initial step prior to placing the document on the scanner 111. In this embodiment, the parameter memory 105 of the Internet facsimile machine 100 stores a command sequence to check whether the entered user ID and password in step 811 is valid. Alternatively, step 811 may include a request by the Internet facsimile machine 100 displayed on the operation panel 125 to request that the operator of the Internet facsimile machine 100 input a user ID and/or password. In an alternative embodiment, access to the ASP may be verified based on recognition of an operator=s fingerprints or retina.

In an alternative embodiment, the Internet facsimile machine 100 verifies access to the ASP 300 without inputting the user ID or recognizing the fingerprints or retina of an operator. In this embodiment, an Administrator of the Internet fax and his/her e-mall address can be registered in the ASP 300. When the ASP 300 receives the documents from the Internet fax 100, a confirmation e-mail for confirming that the transmitted documents will be stored in the folder in the ASP is sent to the administrator's e-mail address. In this embodiment, the confirmation e-mail is sent to the administrator automatically under the control of a controller in the ASP e-mail server 320. It is also possible to send the confirmation e-mall to the administrator by an ASP operator=s manual operation. If the ASP 300 subsequently receives the approval from the administrator, the sent documents are stored in the folder in the ASP 300.

With Access to the document ASP verified, the Internet facsimile machine 100 scans the documents placed on the scanner 111 in step 813. In step 815, the Internet facsimile machine 100 sends the scanned document to the desired location. As indicated above, the desired location is the ASP e-mail address input in step 809 and/or the phone number or e-mail address of the user contact fax 200 input in step 805. According to a preferred embodiment, where the operator of the Internet facsimile machine 100 inputs a phone number or e-mail address of the user contact facsimile machine in step 805, the Internet facsimile machine 100 automatically sends the document on the scanner to the document ASP 300 for storage. In this embodiment, the operator pre stores an ASP e-mail address as a backup for all sent facsimile transmissions. Thus, step 809 of inputting an e-mail address of the ASP, and step 811 of verifying access to the ASP may be bypassed for document transmissions to user contact facsimile machines 200.

Figure 9:
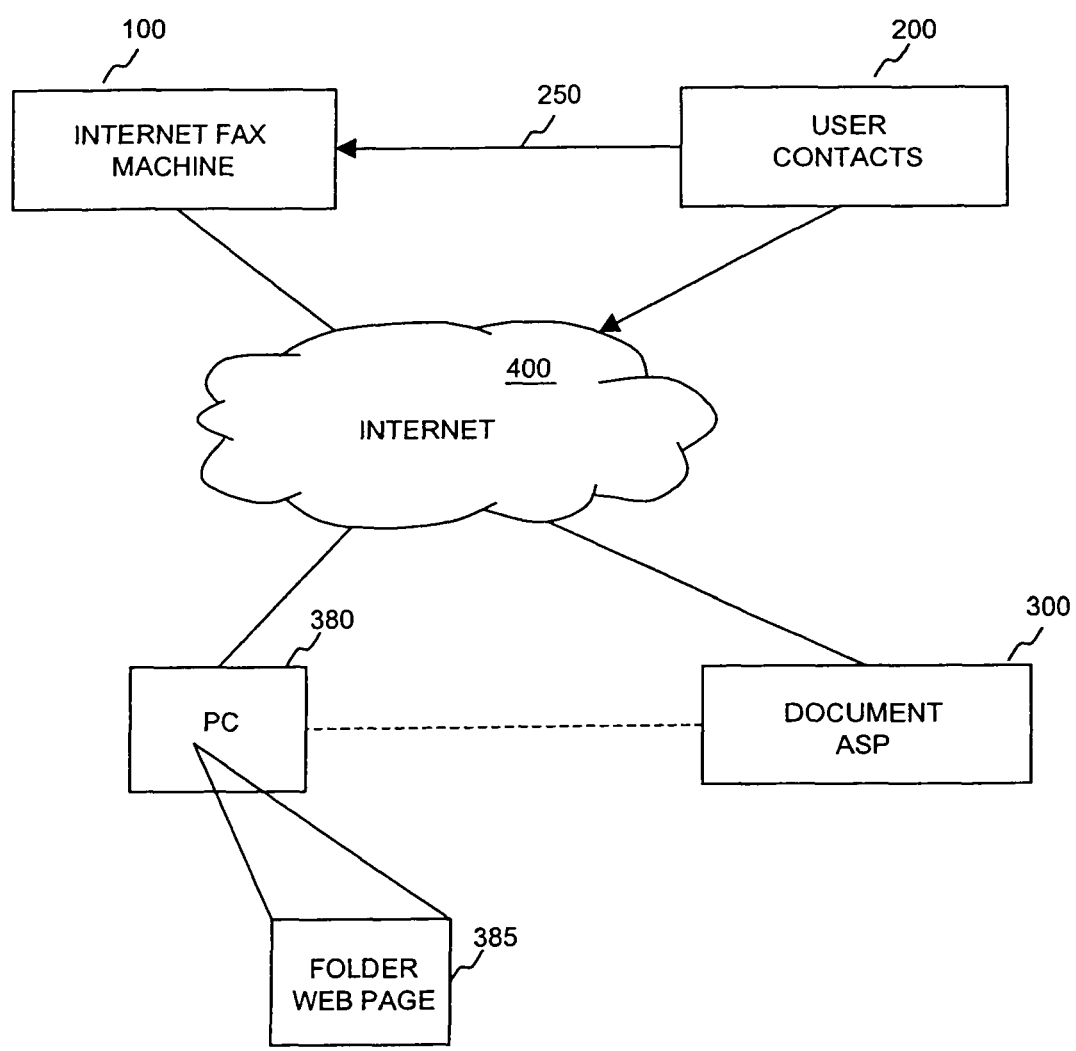
FIG. 9 is a system diagram showing the sending of received documents from an Internet facsimile machine to an ASP according to one embodiment of the present invention.
Figure 10:
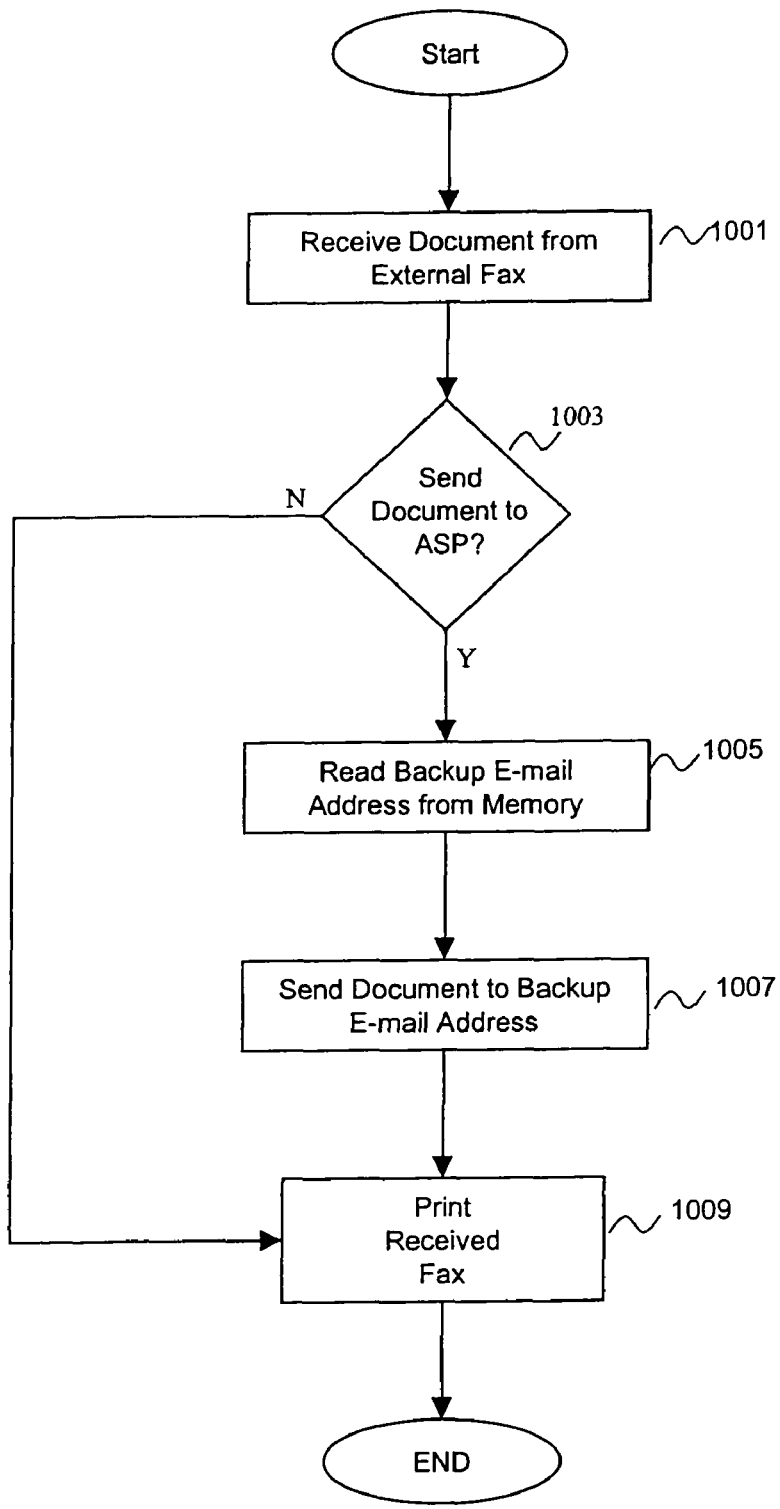
FIG. 10 is a flow chart describing the sending of received documents from an Internet facsimile machine to an ASP according to one embodiment of the present invention.

In another embodiment of the present invention, the Internet facsimile machine 100 is configured to forward all incoming facsimile transmissions to the document ASP 300 for storage. This embodiment may be used in the banking industry, for example, which is regulated to save all fax transmissions. FIG. 9 is a system diagram showing the sending of received documents from the Internet facsimile machine 100 to the ASP 300 according to one embodiment of the present invention. As seen in this figure, the Internet facsimile machine 100 is connected to the document ASP 300 by way of the Internet 400. In addition, the Internet facsimile machine 100 is connected to user contact facsimile machine 200 by way of public phone line 250 and the Internet 400. FIG. 10 is a flow chart describing the sending of received documents from an Internet facsimile machine 100 to the ASP 300 according to one embodiment of the present invention.

In step 1001, the Internet facsimile machine 100 receives a fax document from the user contact facsimile machine 200. As shown in FIG. 9, this fax document may be received via the public phone line 250 or the Internet 400. Once the Internet facsimile machine 100 receives the incoming document, the Internet facsimile machine 100 determines whether the received document will be forwarded to the document ASP 300 as shown in decision block 1003. In a preferred embodiment, the Internet facsimile machine 100 is preset to send all received faxes to a backup file in the ASP 300. Thus, as seen in FIG. 10, after the incoming fax document is received from the user contact facsimile machine 200, the Internet facsimile machine 100 proceeds to step 1005 where a backup e-mail address is read from the parameter memory 105. As described above, the backup e-mail address is a stored ASP e-mail address to which all incoming faxes are sent. Once this backup e-mail address is read, the Internet facsimile machine 100 sends the received document to the ASP 300 associated with the read e-mail address as seen in step 1007. Since the document is sent to ASP 300 as an Internet fax by way of the Internet 400, the document is first routed through the network controller 115 of the Internet facsimile machine 100.

In an alternative embodiment, the incoming facsimile is not automatically sent to the backup e-mail address. In this embodiment, the operator of the Internet facsimile machine 100 may first receive and review the incoming facsimile before selecting a button such as one of the function buttons 160 for on the operation panel 125 to initiate sending of the received document to a backup file in ASP 300. Alternatively, the operator may input a command to the Internet facsimile machine 100 which indicates that the incoming facsimile should not be sent to the ASP 300 as shown by decision block 1003. Whether the incoming facsimile is sent to the ASP or not, the Internet facsimile machine 100 prints the received facsimile in step 1009 using the plotter 113.

Figure 11:
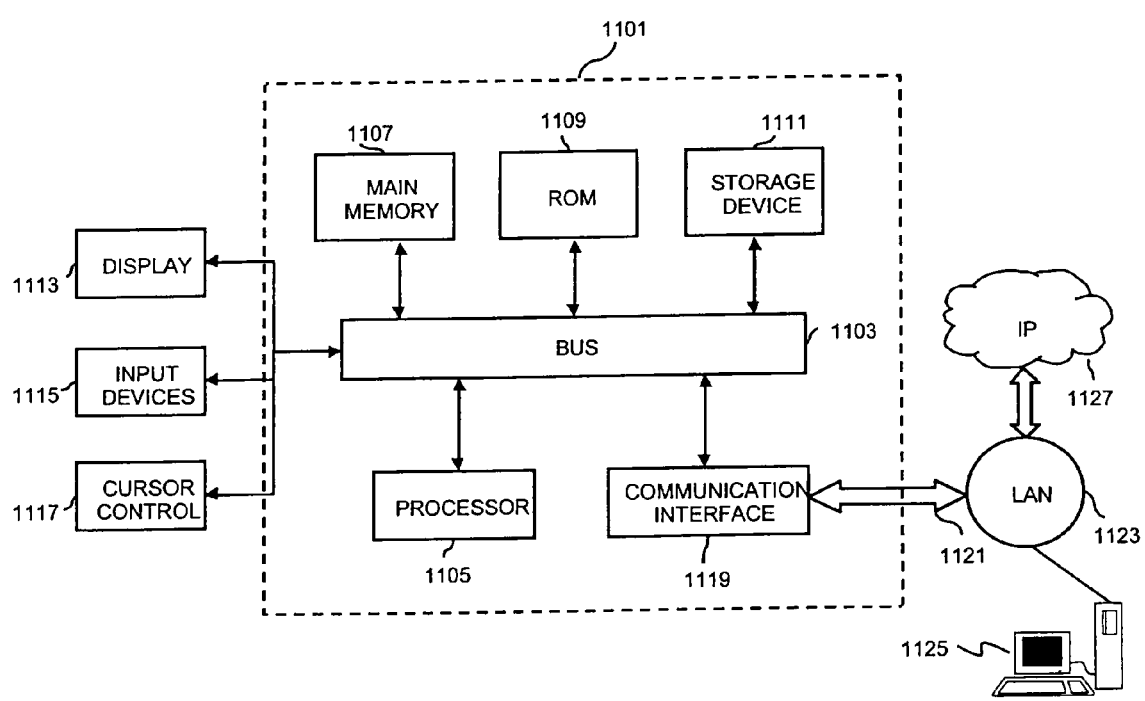
FIG. 11 is a schematic illustration of a computer system programmed to perform one or more special purpose functions of the present invention.

FIG. 11 illustrates a computer system 1101 upon which an embodiment according to the present invention may be implemented. Computer system 1101 includes a bus 1103 or other communication mechanism for communicating information, and a processor 1105 coupled with bus 1103 for processing the information.

The computer system 1101 may also include special purpose logic devices (e.g., application specific integrated circuits (ASICs)) or configurable logic devices (e.g., generic array of logic (GAL) or reprogrammable field programmable gate arrays (FPGAs)). Other removable media devices (e.g., a compact disc, a tape, and a removable magneto-optical media) or fixed, high density media drives, may be added to the computer system 1101 using an appropriate device bus (e.g., a small computer system interface (SCSI) bus, an enhanced integrated device electronics (IDE) bus, or an ultra-direct memory access (DMA) bus). The computer system 1101 may additionally include a compact disc reader, a compact disc reader-writer unit, or a compact disc juke box, each of which may be connected to the same device bus or another device bus.

Computer system 1101 may be coupled via bus 1103 to a display 1113, such as a cathode ray tube (CRT), for displaying information to a computer user. The display 1113 may be controlled by a display or graphics card. The computer system includes input devices, such as a keyboard 1115 and a cursor control 1117, for communicating information and command selections to processor 1105. The cursor control 1117, for example, is a mouse, a trackball, or cursor direction keys for communicating direction information and command selections to processor 1105 and for controlling cursor movement on the display 1113.

The computer system 1101 performs a portion or all of the processing steps of the invention in response to processor 1105 executing one or more sequences of one or more instructions contained in a memory, such as the main memory 1107. Such instructions may be read into the main memory 1107 from another computer-readable medium, such as storage device 1111. One or more processors in a multi-processing arrangement may also be employed to execute the sequences of instructions contained in main memory 1107. In alternative embodiments, hard-wired circuitry may be used in place of or in combination with software instructions. Thus, embodiments are not limited to any specific combination of hardware circuitry and software.

As stated above, the system 1101 includes at least one computer readable medium or memory programmed according to the teachings of the invention and for containing data structures, tables, records, or other data described herein. Stored on any one or on a combination of computer readable media, the present invention includes software for controlling the computer system 1101, for driving a device or devices for implementing the invention, and for enabling the computer system 1101 to interact with a human user, e.g., a customer.

Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The term "computer readable medium" as used herein refers to any medium that participates in providing instructions to processor 1105 for execution. A computer readable medium may take many forms, including but not limited to, non-volatile media, volatile media, and transmission media. Non-volatile media includes, for example, optical, magnetic disks, and magneto-optical disks, such as storage device 1111. Volatile media includes dynamic memory, such as main memory 1107. Transmission media includes coaxial cables, copper wire and fiber optics, including the wires that comprise bus 1103. Transmission media also may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave (described below), or any other medium from which a computer can read.

Various forms of computer readable media may be involved in carrying out one or more sequences of one or more instructions to processor 1105 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to computer system 1101 may receive the data on the telephone line and use an infrared transmitter to convert the data to an infrared signal. An infrared detector coupled to bus 1103 can receive the data carried in the infrared signal and place the data on bus 1103. Bus 1103 carries the data to main memory 1107, from which processor 1105 retrieves and executes the instructions. The instructions received by main memory 1107 may optionally be stored on storage device 1111 either before or after execution by processor 1105.

Computer system 1101 also includes a communication interface 1119 coupled to bus 1103. Communication interface 1119 provides a two-way data communication coupling to a network link 1121 that is connected to a local network (e.g., LAN 1123). For example, communication interface 1119 may be a network interface card to attach to any packet switched local area network (LAN). As another example, communication interface 1119 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 1119 sends and receives electrical, electromagnetic or optical signals that carry digital data streams representing various types of information.

Network link 1121 typically provides data communication through one or more networks to other data devices. For example, network link 1121 may provide a connection through LAN 1123 to a host computer 1125 or to data equipment operated by a service provider, which provides data communication services through an IP (Internet Protocol) network 1127 (e.g., the Internet 607). LAN 1123 and IP network 1127 both use electrical, electromagnetic or optical signals that carry digital data streams. The signals through the various networks and the signals on network link 1121 and through communication interface 1119, which carry the digital data to and from computer system 1101, are exemplary forms of carrier waves transporting the information. Computer system 1101 can transmit notifications and receive data, including program code, through the network(s), network link 1121 and communication interface 1119.

Obviously, numerous additional modifications and variations of the present invention are possible in light of the above teachings. It is therefore to be understood that within the scope of the appended claims the present invention may be practiced otherwise than as specifically described herein.

What is claimed is:

1. A method of storing document information in a computer configured to access an e-mail server and having a storage device, the computer being configured to communicate with the e-mail server which is connected to a scanner terminal through a network, the method comprising the steps of:
   receiving, at said computer, said document information from the scanner terminal by obtaining said document information from the e-mail server after said document information has been sent from the scanner terminal over the Internet to an e-mail address of the e-mail server;
   accessing, from said computer, a storage folder previously created in said storage device and associated with said e-mail address of the e-mail server, to store said document information that has been sent to the email address; and
   automatically storing said document information to said storage folder in said storage device, wherein each document type has a corresponding e-mail address folder to store the document information.

2. The method of claim 1, wherein said receiving comprises receiving an e-mail attachment sent from the scanner terminal to the e-mail address of the e-mail server.

3. The method of claim 1, further comprising sending a storage confirmation message to the scanner terminal after storing said document information to said storage folder.

4. The method of claim 1, wherein said receiving comprises obtaining said document information from the e-mail server via the Internet.

5. The method of claim 1, wherein said automatically storing comprises automatically storing said document information to said storage folder via an intranet.

6. An apparatus for storing document information, comprising:
   a storage device configured to store document information;
   a communication interface configured to communicate with an e-mail server which is connected to a scanner terminal through a network; and
   a processor configured to:
      receive said document information from the scanner terminal by obtaining said document information from the e-mail server after said document information has been sent from the scanner terminal over the Internet to an e-mail address of the e-mail server, access, from said storage device, a storage folder previously created in said storage device and associated with said e-mail address, to store said document information that has been sent to the email address, and automatically store said document information to said storage folder in said storage device, wherein each document type has a corresponding e-mail address folder to store the document information.

7. The apparatus of claim 6, wherein said processor is configured to receive an e-mail attachment sent from the scanner terminal to the e-mail address of the e-mail server.

8. The apparatus of claim 6, wherein said processor is further configured to send a storage confirmation message to the scanner terminal after storing said document information to said storage folder.

9. The apparatus of claim 6, wherein said processor is configured to obtain said document information from the e-mail server via the Internet.

10. The apparatus of claim 6, wherein said processor is configured to automatically store said document information to said storage folder via an intranet.

11. A system comprising:
memory configured to store document information;
communication interface configured to access a scanner terminal through a network; and
processor in communication with said memory, said processor configured to:
receive said document information from the scanner terminal when said document information has been sent from the scanner terminal over the Internet to an e-mail address associated with said processor,
access a storage folder previously created in said memory and associated with said e-mail address of the processor to store said document information that has been sent to the email address, and
automatically store said document information to said storage folder in said memory, wherein each document type has a corresponding e-mail address folder to store the document information.

12. The system of claim 11, wherein said processor is configured to receive an c-mail attachment sent from the scanner terminal to the e-mail address.

13. The system of claim 11, wherein said processor is further configured to send a storage confirmation message to the scanner terminal after storing said document information to said storage folder.

14. The system of claim 11, wherein said processor is configured to receive said document information via the Internet.

15. The system of claim 11, wherein said processor is configured to automatically store said document information to said storage folder via an intranet.

16. The system of claim 11, wherein said processor is a distributed processor.

17. The system of claim 16, wherein said processor is distributed among a server and a client of the server.

18. The system of claim 17, wherein said server is an e-mail server.

19. The system of claim 11, wherein said memory is further configured to store data relating to the storing of said document information.

20. The system of claim 11, wherein said memory is distributed among a server and a client of the server.

21. The system of claim 20, wherein said server is an e-mail server.

22. A computer readable storage medium containing program instructions for execution on a computer system configured to access an e-mail server and having a storage device, the computer system being configured to communicate with the e-mail server which is connected to a scanner terminal through a network, the instructions, when executed by the computer system, causing the computer system to perform the step of:
receiving document information from the scanner terminal by automatically obtaining said document information from the e-mail server after said document information has been sent from the scanner terminal over the Internet to an e-mail address of the e-mail server;
accessing, from said computer system, a storage folder previously created in said storage device and associated with said e-mail address of the e-mail server to store said document information that has been sent to the email address; and
automatically store said document information to said storage folder in said storage device, wherein each document type has a corresponding e-mail address folder to store the document information.

23. The computer readable storage medium of claim 22, further containing program instructions which, when executed by the computer system, cause the computer system to receive an e-mail attachment sent from the scanner terminal to the e-mail address of the e-mail server.

24. The computer readable storage medium of claim 22, further containing program instructions which, when executed by the computer system, cause the computer system to store said document information to said storage folder.

25. The computer readable storage medium of claim 22, further containing program instructions which, when executed by the computer system, cause the computer system to obtain said document information from the e-mail server via the Internet.

26. The computer readable storage medium of claim 22, further containing program instructions which, when executed by the computer system, cause the computer system to automatically store said document information to said storage folder via an intranet.

27. The computer readable storage medium of claim 22, the medium comprising a distributed storage medium.

28. A system comprising:
means for storing document information;
means for connecting the system to an e-mail server and a scanner terminal through a network;
means for receiving said document information from the scanner terminal by obtaining said document information from the e-mail server after said document information has been sent from the scanner terminal over the Internet to an e-mail address of the e-mail server;
means for accessing, from said means for storing, a storage folder previously created in said means for storing and related to said e-mail address of the e-mail server to store said document information that has been sent to the email address, and
means for automatically storing said document information to said storage folder, wherein each document type has a corresponding e-mail address folder to store the document information.

29. The system of claim 28, wherein said means for storing document information comprises means for storing a set of computer executable code instructions, related to storing the document information, as a plurality of portions of the set of computer executable code instructions stored at distributed locations.

30. The system of claim 29, wherein said means for causing comprises means for processing, at distributed processing locations, a set of computer executable code instructions related to storing the document information.

* * * * *